US007498053B2

(12) United States Patent
Lim et al.

(10) Patent No.: US 7,498,053 B2
(45) Date of Patent: Mar. 3, 2009

(54) INORGANIC THIN FILM ELECTROLUMINESCENT DEVICE AND METHOD FOR MANUFACTURING THE SAME

(75) Inventors: Jung Wook Lim, Daejeon-Shi (KR); Sun Jin Yun, Daejeon-Shi (KR); Jin Ho Lee, Daejeon-Shi (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 652 days.

(21) Appl. No.: 10/844,388

(22) Filed: May 13, 2004

(65) Prior Publication Data

US 2005/0064236 A1 Mar. 24, 2005

(30) Foreign Application Priority Data

Sep. 19, 2003 (KR) ...................... 10-2003-0064960

(51) Int. Cl.
*B05D 5/12* (2006.01)
*B32B 7/02* (2006.01)
*H01J 29/82* (2006.01)

(52) U.S. Cl. ......................... 427/66; 428/212; 428/213; 428/690; 428/917; 313/503; 313/506

(58) Field of Classification Search ................. 313/504, 313/506, 503, 509, 512; 427/66; 428/212, 428/213, 690, 917

See application file for complete search history.

(56) References Cited

U.S. PATENT DOCUMENTS 5,074,817 A * 12/1991 Song ............................ 445/24
5,955,835 A * 9/1999 Oh et al. ...................... 313/503
6,207,302 B1 * 3/2001 Sugiura et al. .............. 428/690
6,358,632 B1 3/2002 Dickey et al.
6,403,204 B1 * 6/2002 Kitai et al. .................. 428/212
6,577,059 B2 6/2003 Shirakawa et al. .......... 313/506
6,650,046 B2 * 11/2003 Shirakawa et al. .......... 313/506
6,723,642 B1 * 4/2004 Lim et al. ................... 438/680
2002/0064927 A1 5/2002 Lee et al.

FOREIGN PATENT DOCUMENTS

KR 10-1991-0013600 8/1991
KR 2002-42228 6/2002

OTHER PUBLICATIONS

Lim et al., Characteristics of aluminum oxinitride film grown by plasma-enhanced atomic layer deposition insulator of an electroluminescent device, Journal of the Society for Information Display, Sep. 2003, vol. 11, Issue 3, pp. 505-509.*

(Continued)

*Primary Examiner*—D. Lawrence Tarazano
*Assistant Examiner*—Camie S Thompson
(74) *Attorney, Agent, or Firm*—Lowe Hauptman Ham & Berner, LLP

(57) ABSTRACT

Provided is an inorganic thin film electroluminescent device including a lower electrode, a lower insulating layer, a phosphor, an upper insulating layer, and an upper electrode, and the method for manufacturing the same, whereby it is possible to obtain the inorganic thin film electroluminescent device capable of realizing high brightness, excellent luminescence efficiency, and low breakdown field.

5 Claims, 4 Drawing Sheets

OTHER PUBLICATIONS

H.W. Lee, "High-x Gate Dielectrics", Journal of Electrical and Electronics Material, Dec. 15, 2001, vol. 14, No. 12.

C. T. Hsu, et al.; "*High luminous efficiency thin-film electroluminescent devices with low resistivity insulating materials*" J. Appl. Phys.; vol. 71, No. 3; Feb. 1, 1992; pp. 1509-1512.

Kshem Prasad, et al.; "*Ce-doped $TiO_2$ Insulators in Thin Film Electroluminescent Devices*"; Jpn. J. Appl. Phys.; vol. 36, Part 1, No. 9A; Sep. 1997; pp. 5696-5702.

Jung Wook Lim, et al.; "*Insulators with High Stability for Electroluminescent Devices*"; Jpn. J. Appl. Phys.; vol. 42, Part 2, No. 6B; Jun. 15, 2003; pp. L663-L665.

Ura et al., "An Integrated-Optic Disk Pickup Device", IEEE, Jul. 1986, vol. LT-4, No. 7, pp. 913-918.

Sheard et al., "Focusing wasveguide grating coupler using a diffractive doublet", Applied Optics, Jul. 1997, vol. 36, No. 19, pp. 4349-4353.

* cited by examiner

INORGANIC THIN FILM ELECTROLUMINESCENT DEVICE AND METHOD FOR MANUFACTURING THE SAME

BACKGROUND

1. Field of the Invention

The present invention relates to an inorganic thin film electroluminescent device and a method for manufacturing the same and, more specifically, to an inorganic thin film electroluminescent device having a multi-layered insulating layer and a method for manufacturing the same.

2. Discussion of Related Art

An inorganic thin film electroluminescent device is such a device that an electron accelerated by high electric field collides with a phosphor to excite it, thereby inducing luminescence. While the inorganic thin film electroluminescent device has merits of high brightness, long life time, high resolving power, or the like, it has demerits of high driving voltage and a lack of a stable blue phosphor. It has been disclosed in "Journal of Applied Physics, 71, pp 1509, 1992".

Meanwhile, the inorganic thin film electroluminescent device is composed of the phosphor for luminescence, an insulating layer for protecting the phosphor, and an electrode. Particularly, the insulating layer contributes to stabilize a device by protecting the device from dielectric breakdown and outer impurities, and to determine luminescent efficiency and luminance characteristic depending on an interface state between the phosphor and the insulating layer as well. It has been disclosed in "Applied Optics, 36, pp 545, 1997". Therefore, the insulating layer should have a high breakdown field to contribute a stability of a device, and a high dielectric constant enough to lower a threshold voltage and to implement a device having a high brightness. In other words, a performance of the insulating layer is determined by figure of merit, which is obtained by multiplying a dielectric constant and a breakdown field. It has been disclosed in "Japanese Journal of Applied Physics, 36, pp 5696 1997".

As the insulating layer for the inorganic thin film electroluminescent device, a low dielectric constant film (hereinafter, referred to as low-k film) such as a silicon oxide ($SiO_2$), a silicon nitride (SiN), or the lime, which is focused on a stability of a device, was used in the beginning stage. Thereafter, an aluminum oxide ($Al_2O_3$) thin film having a relative dielectric constant of 8 to 10 was employed. Particularly, in the case of using a thin film deposited by an atomic layer deposition (ALD) method, figure of merit was the highest level of approximately 4 to 6 $\mu C/cm^2$.

Then, a number of studies for enhancing breakdown field were performed by introducing a high dielectric constant film (hereinafter, referred to as high-k film). In the case of a titanium oxide ($TiO_2$), it was obtained an improved value of 3.5 $\mu C/cm^2$ from 1 $\mu C/cm^2$, by doping cerium (Ce). It has been disclosed in "Japanese Journal of Applied Physics part 1, 36, pp 5696, 1997". However, there was a problem from the point of view of a device stability, and a thickness of an insulating layer, i.e. approximately 270 nm, was thick relatively. Besides, many attempts to use a high-k film such as an yttrium oxide ($Y_2O_3$), a tantalum oxide ($Ta_2O_5$), a barium titanate ($BaTiO_3$), etc. have been tried. However, there was a difficulty in insuring a stability and high performance of a device, in spite of its high figure of merit. Here, the high-k film refers to a thin film having a relatively high dielectric constant of 10 or more, and the low-k film refers to a thin film having a relatively low dielectric constant.

Meanwhile, in order to satisfy the aforementioned two contrary conditions, that is, high stability and high dielectricity, multi structures of $Al_2O_3$ and $TiO_2$, or $Al_2O_3$ and $Ta_2O_5$ have been tried. The present inventors insured the high stability in the device, by employing an aluminum oxynitride (AlON) thin film. Here, the AlON thin film has a little bit improved permittivity and breakdown characteristic of approximately 10 MV/cm as compared with the conventional $Al_2O_3$, by using a plasma atomic layer deposition method. It has been disclosed in "Japanese Journal of Applied Physics part 2, 42, pp L663, 2003". It may be a significant technology in that dielectric characteristics would be enhanced without lowering permittivity in the same material, by employing a new deposition method. However, it has been still required higher stability and permittivity in the device.

SUMMARY OF THE INVENTION

The present invention is contrived to solve the aforementioned problems, and is directed to an inorganic thin film electroluminescent device having characteristics such as stability, high efficiency, and low threshold voltage of the device, and a method for manufacturing the same.

In addition, the present invention provides an inorganic thin film electroluminescent device having improved luminance characteristic, and a method for manufacturing the same.

Further, the present invention can provide an inorganic thin film electroluminescent device using a multi-layered insulating layer, which has a good uniformity by a plasma enhanced atomic layer deposition method, and a method for manufacturing the same.

One aspect of the present invention is to provide an inorganic thin film electroluminescent device, comprising a lower electrode, a lower insulating layer, a phosphor, an upper insulating layer, and an upper electrode, which are sequentially stacked, wherein at least one of the lower insulating layer and the upper insulating layer is a multi-layered insulating layer having a low-k film and a high-k film that is contacted with the phosphor.

Here, the high-k film is a $M_HON$, a $M_HO_2$, or a ternary oxide film, the $M_H$ is Ta, Ti, Y, Zr, Zn, Mg, Ca, Hf, Ba, or lanthanide, the low-k film is $M_LON$, and the $M_L$ is Al. In addition, the multi-layered insulating layer is a 2-layered insulating layer, and a thickness ratio of the high-k film to the multi-layered insulating layer is in the range of ⅙ to ½.

Another aspect of the present invention is to provide a method for manufacturing an inorganic thin film electroluminescent device, comprising the steps of: forming a lower electrode; forming a lower insulating layer on the lower electrode; forming a phosphor on the lower insulating layer; forming an upper insulating layer on the phosphor; and forming an upper electrode on the upper insulating layer, wherein at least one of the steps of forming the lower insulating layer and the upper insulating layer is a step of forming a multi-layered insulating layer having a low-k film and a high-k film which is contacted with the phosphor.

Here, the step of forming the insulating layer or the dielectric film (the high-k film or the low-k film) is composed of one or more than two PEALD cycles, said each cycle comprising the steps of: injecting a precursor; performing a first purge; applying plasma while injecting a reaction gas; and performing a second purge. In case where the dielectric film is the high-k film, the precursor includes Ta, Ti, Y, Zr, Zn, Mg, Ca, Hf, Ba, or lanthanide, and in case where the dielectric film is the low-k film, the precursor is TMA.

Meanwhile, the reaction gas is $O_2+N_2$ or $O_2$, and the step of forming the multi-layered insulating layer is performed in-situ.

BRIEF DESCRIPTION OF THE DRAWINGS

The above and other objects, advantages and features of the present invention will become apparent from the following description of preferred embodiments given in conjunction with accompanying drawings, in which.

DETAILED DESCRIPTION OF PREFERRED EMBODIMENTS

Figure 1:
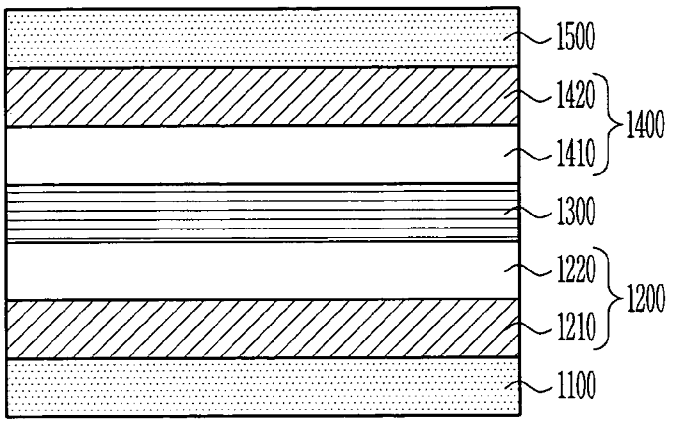
FIG. 1 shows a schematic structure of an inorganic thin film electroluminescent device in accordance with a preferred embodiment of the present invention.

The present invention will be described in detail by way of a preferred embodiment with reference to accompanying drawings, in which like reference numerals are used to identify the same or similar parts.

FIG. 1 shows a schematic structure of an inorganic thin film electroluminescent device, according to a preferred embodiment of the present invention.

The inorganic thin film electroluminescent device of FIG. 1 comprises a lower electrode 1100, a lower insulating layer 1200, a phosphor 1300, an upper insulating layer 1400, and an upper electrode 1500.

The lower electrode 1100 and the upper electrode 1500 may be an indium tin oxide (ITO) of a transparent electrode having hundreds of nm in a thickness.

The phosphor 1300 can be formed by depositing a sulfide such as a zinc sulfide (ZnS), a strontium sulfide (SrS), etc. with a dopant together. Here, the dopant may be a manganese (Mn), a lead (Pb), a lanthanide, etc. that provides luminescent colors of the three primary colors. And, the thickness thereof may be changed from hundreds of nm to thousands of nm.

At least one of the lower insulating layer 1200 and the upper insulating layer 1400 must be a multi-layered insulating layer having low-k films 1210 and 1420, and high-k films 1220 and 1410 that are contacted with the phosphor 1300. In other words, at least one of the lower insulating layer 1200 and the upper insulating layer 1400 is the multi-layered insulating layer, and has the low-k films 1210 and 1420, and the high-k films 1220 and 1410. At this time, the high-k films are disposed to be contacted with the phosphor 1300. The multi-layered insulating layer refers to an insulating layer having 2-layered or more than 3-layered dielectric film.

Preferably, the low-k films 1210 and 1420 are composed of $M_LON$, and the high-k films 1220 and 1410 are composed of $M_HON$. Here, $M_L$ indicates a metal component of the low-k films 1210 and 1420, and may be Al, for example. $M_H$ indicates a metal component of the high-k films 1220 and 1410, and could be Ti, for example. The dielectric films, that is, the high-k films and the low-k films, are preferably grown by employing a plasma enhanced atomic layer deposition (hereinafter, referred to as PEALD) method. The dielectric films grown by the PEALD have improved characteristics, as compared with those grown by an atomic layer deposition (ALD) of a prior art. Meanwhile, as the high-k films 1220 and 1410, $M_HO_2$ grown by the PEALD or ternary system oxide films such as $BaTiO_3$ and strontium titanate ($SrTiO_3$) may be used. Here, $M_L$ could be Al, and $M_H$ could be Ta, Ti, Y, Zr, Zn, Mg, Ca, Hf, Ba, or lanthanide.

In the inorganic thin film electroluminescent device, electrons trapped in interfaces between the phosphor 1300 and the insulating layers 1200 and 1400 are accelerated by electric field, and collide with the phosphor 1300, so that the phosphor 1300 is excited and luminescent. Here, it is possible to obtain the electroluminescent device with high brightness and to lower threshold voltage, by disposing the high-k films 1220 and 1410 of the dielectric films composing the multi-layered insulating layer, at the interfaces with the phosphor 1300, to increase site density of electron. In addition, high stability can be achieved so that the multi-layered insulating layer has the low-k films with high breakdown voltage.

Hereinafter, a method for manufacturing the inorganic thin film electroluminescent device according to a preferred embodiment of the present invention will be explained with reference to FIG. 1.

The method for manufacturing the inorganic thin film electroluminescent device comprises the steps of forming the lower electrode 1100, the lower insulating layer 1200, the phosphor 1300, the upper insulating layer 1400, and the upper electrode 1500.

At first, the lower electrode 1100 is formed by depositing ITO or Al thin film of a transparent electrode with a thickness of approximately hundreds of nm, by using a physical deposition method such as a sputtering. Then, the lower insulating layer 1200 is formed to a monolayer or a multi-layered insulating layer.

The phosphor 1300 is formed by depositing a sulfide such as ZnS, SrS, etc. with a dopant together. Here, the dopant may be Mn, Pb, lanthanide, etc. that provides luminescent colors of the three primary colors. As a deposition method, physical deposition method or ALD can be employed. The thickness may be varied from hundreds of nm to thousands of nm. Thereafter, the upper insulating layer 1400 composed of a monolayer or multi-layers is formed, and the upper electrode 1500 is formed using the same method as that of forming the lower electrode 1100, or similar to that.

At least one of the steps for forming the lower insulating layer 1200 and the upper insulating layer 1400 should be a step of forming a multi-layered insulating layer having the low-k films 1210 and 1420, and the high-k films 1220 and 1410 that are contacted with the phosphor 1300.

Thus, all the steps of forming the lower insulating layer 1200 and the upper insulating layer 1400 may be a step of forming a multi-layered insulating layer. Otherwise, one is a step of forming a multi-layered insulating layer and the other is a step of forming a monolayer-insulating layer. In the step of forming the multi-layered insulating layer, a 2-layered insulating layer having a high-k film and a low-k film could be formed. In addition, the multi-layered insulating layer having 3 layers or more, in which the high-k film and the low-k film are included, can be formed. Even in this case, the multi-layered insulating layer should be formed so that the high-k film is contacted with the phosphor 1300.

According to the present embodiment, as described above, it is possible to obtain the inorganic thin film electroluminescent device capable of realizing high brightness, excellent luminescence efficiency, and low breakdown field, by forming the lower insulating layer 1200 and the upper insulating layer 1400 as the multi-layered insulating layers having the high-k films 1220 and 1410 and the low-k films 1210 and 1420, and disposing the high-k films 1220 and 1410 contacted to the phosphor 1300.

As a method for manufacturing the lower insulating layer 1200 and the upper insulating layer 1400, a physical deposition method, ALD, or PEALD may be employed.

In ALD of these methods, contrary to a conventional chemical vapor deposition (CVD) in which a precursor and a reaction gas are implanted at the same time, the precursor like a source and the reaction gas are provided, individually, so that they are absorbed into a surface to induce a surface reaction, thereby depositing a thin film. In ALD, a purge gas is injected between the pulses, respectively, to remove the remaining gas. In addition, a uniform thin film can be obtained with good coverage, since the precursor is controlled as an atomic layer unit by not being decomposed but absorbed.

PEALD is an improved ALD but different from ALD in that plasma is directly applied during injection of the reaction gas. By applying plasma directly as described above, reactivity of the reaction gas can be increased. As a result, PEALD has merits that a dense thin film can be obtained as compared with ALD, and deposition rate of the insulating layer can be improved.

Now, the process of forming the insulating layer using PEALD will be explained with reference to FIG. 2. For convenience of explanation, the insulating layer refers to the lower insulating layer, in which the low-k film is AlON and the high-k film is TiON.

Figure 2:
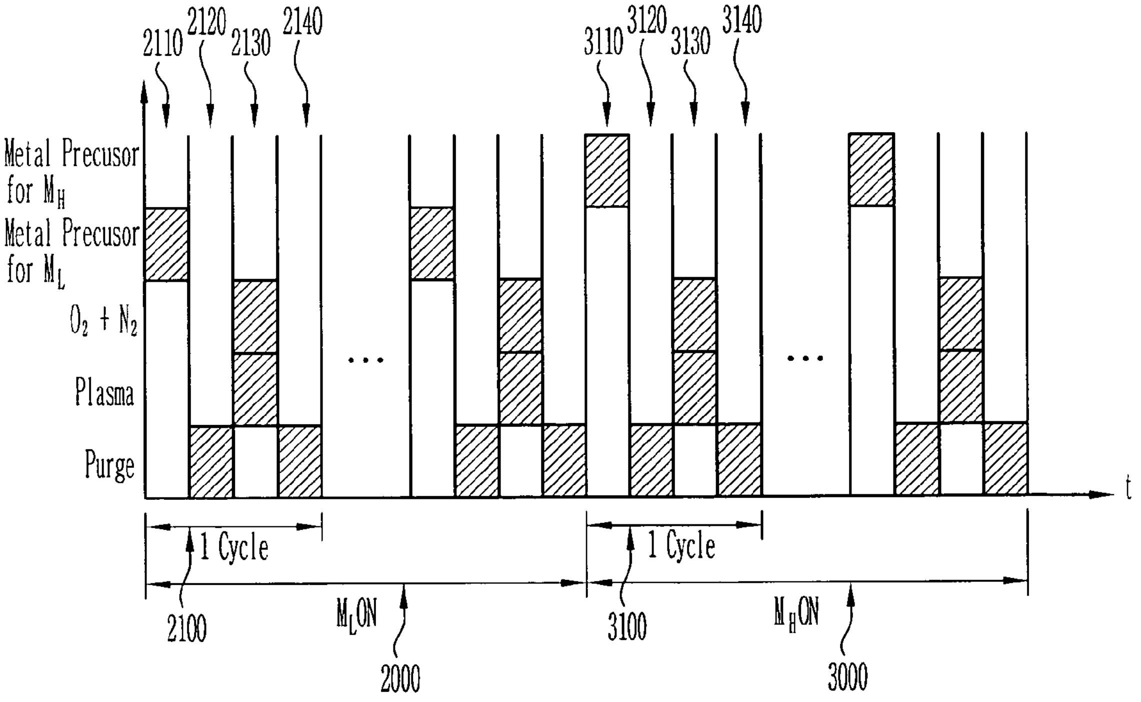
FIG. 2 is a view for explaining a method for manufacturing an inorganic thin film electroluminescent device and a multi-layered insulating layer, in accordance with a preferred embodiment of the present invention.

In FIG. 2, the step of forming the lower insulating layer comprises the steps 2000 and 3000 of forming the low-k film and the high-k film, respectively.

The step 2000 of forming the low-k film is composed of the same cycles 2100 being repeated several times. Each cycle 2100 comprises the steps of: injecting the precursor into the surface and absorbing it 2110; a first purge 2120; applying plasma while injecting the reaction gas 2130; and a second purge 2140. In the step 2110 of injecting the precursor, the precursor for forming AlON may be trimethyl aluminum (TMA). In the step 2120 of the first purge, remaining precursors, which are not absorbed into the surface, are removed by using inert gas. In the step 2130 of applying plasma while injecting the reaction gas, the reaction gas is $N_2$ and $O_2$. In the step 2140 of the second purge, unreacted gas is removed by using inert gas.

The step 3000 of forming the high-k film is composed of the same cycles 3100 being repeated several times, similar to the step 2000 of forming the low-k film. Each cycle 3100 comprises the steps of: injecting the precursor to the surface and absorbing it 3110; a first purge 3120; applying plasma while injecting the reaction gas 3130; and a second purge 3140. Each cycle 3100 in the step 3000 of forming the high-k film is the same as each cycle 2100 in the step 2000 of forming the low-k film except that the precursor includes Ta, Ti, Y, Zr, Zn, Mg, Ca, Hf, Ba, or lanthanide. For example, the precursor may be titanium isopropoxide (TTIP) or tetra-dimethyl amino titanium (TDMATi).

In case where the low-k film is formed as $Al_2O_3$ not AlON, or the high-k film is formed as $TiO_2$ not TiON, $O_2$ is only injected as the reaction gas instead of $O_2+N_2$. In addition, in the case of forming the ternary oxide film as the high-k film, such as $BaTiO_3$ and $SrTiO_3$, the precursor TTIP or TDMATi corresponding to Ti and a precursor corresponding to Ba or Sr should be injected, at the same time.

As described above, by applying plasma with injection of the reaction gas, when forming the insulating layer, the reaction gas having high reactivity, such as a radical or an ion, is generated, so that a surface reaction becomes improved. In addition, stability and high performance of the device can be assured at the same time, by sequentially forming the low-k film and the high-k film, without exposing the device to the atmosphere. In other words, the low-k film and the high-k film are deposited in-situ.

The step of forming the upper insulating layer using PEALD has been made easily by a person with ordinary skill in the pertinent from the technical point expressed in the step of forming the lower insulating layer. Thus, for convenience of explanation, it will not be explained.

Hereinafter, characteristics of the inorganic thin film electroluminescent device according to the embodiment of the present invention will be explained with reference to FIGS. 3 and 4.

Figure 3:
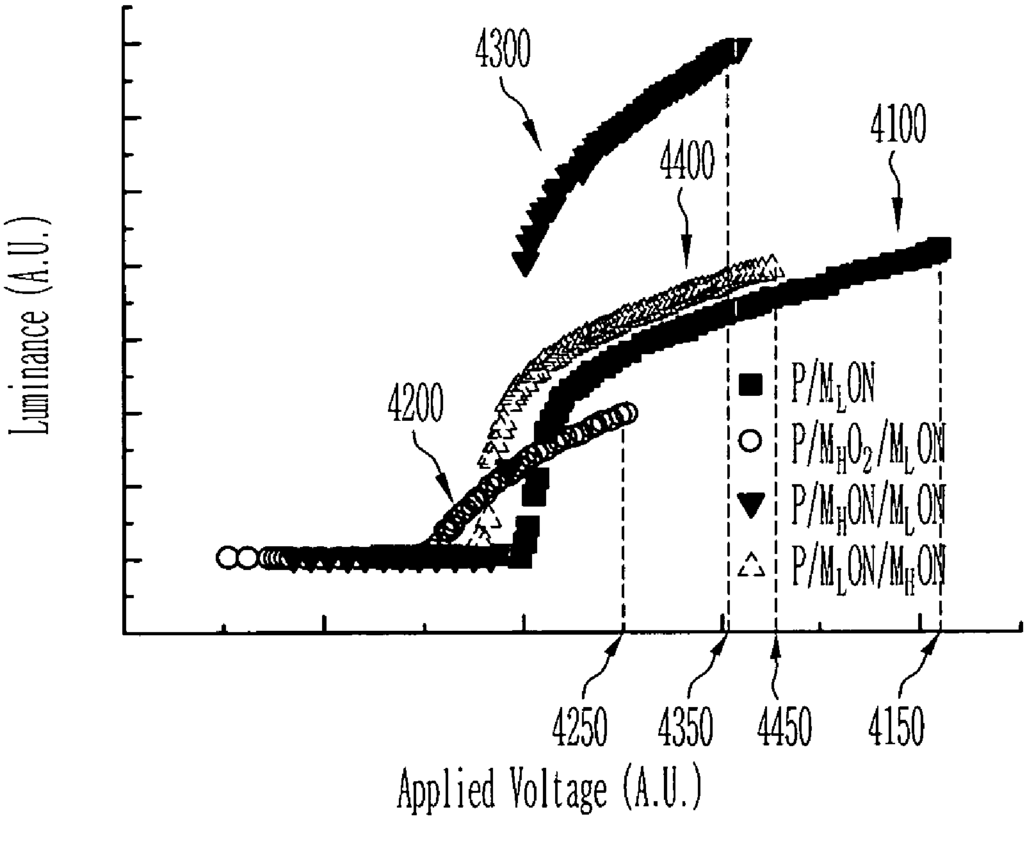
FIGS. 3 and 4 are graphs for comparing characteristics of an inorganic thin film electroluminescent device according to a preferred embodiment of the present invention, with those of a prior art.

FIG. 3 shows the result of an experiment for a luminance variation depending on an applied voltage, in the inorganic thin film electroluminescent devices composed of various structures.

In the present experimentation, the lower insulating layer is fixed at $M_LON$ and the upper insulating layer is only varied. P/$M_LON$ 4100 indicates that the upper insulating layer is composed of a monolayer of $M_LON$. P/$M_HO_2$/$M_LON$ 4200 indicates that $M_HO_2$ of the high-k film grown by ALD is contacted with the phosphor P and $M_LON$ of the low-k film is contacted with an electrode. On the contrary, P/$M_LON$/$M_HON$ 4400 indicates that $M_LON$ of the low-k film is contacted with the phosphor and $M_HON$ of the high-k film grown by PEALD is contacted with the electrode.

At first, the case 4300 that the insulating layer is the multi-layered insulating layer and the interface with the phosphor is the high-k film will be compared with the case 4400 that the insulating layer is the multi-layered insulating layer and the interface with the phosphor is the low-k film. As a result, the case 4300 that the interface of the phosphor is the high-k film has much higher luminance than the case 4400 that the interface with the phosphor is the low-k film, whereby luminescent efficiency is excellent. However, the breakdown field 4350 in the case 4300 that the interface with the phosphor is the high-k film is similar to the breakdown field 4450 in the case 4400 that the interface with the phosphor is the low-k film. Therefore, it can be noted that the case 4300 that the insulating layer is the multi-layered insulating layer and the interface with the phosphor is the high-k film has more improved characteristic than the case 4400 that the insulating layer is the multi-layered insulating layer and the interface with the phosphor is the low-k film.

Next, the case 4300 that the high-k film is grown by PEALD will be compared with the case 4200 that the high-k film is grown by ALD. In the case 4300 where the high-k film is grown by PEALD, luminance is higher and luminescent efficiency is more improved than the case 4200 that the high-k film is grown by ALD. The breakdown field 4350 in the case 4300 that the high-k film is grown by PEALD is much higher than the breakdown field 4250 in the case 4200 that the high-k film is grown by ALD. Thus, it is noted that the case 4300 that the high-k film is grown by PEALD has more improved characteristic than the case 4200 that the high-k film is grown by ALD.

Figure 4:
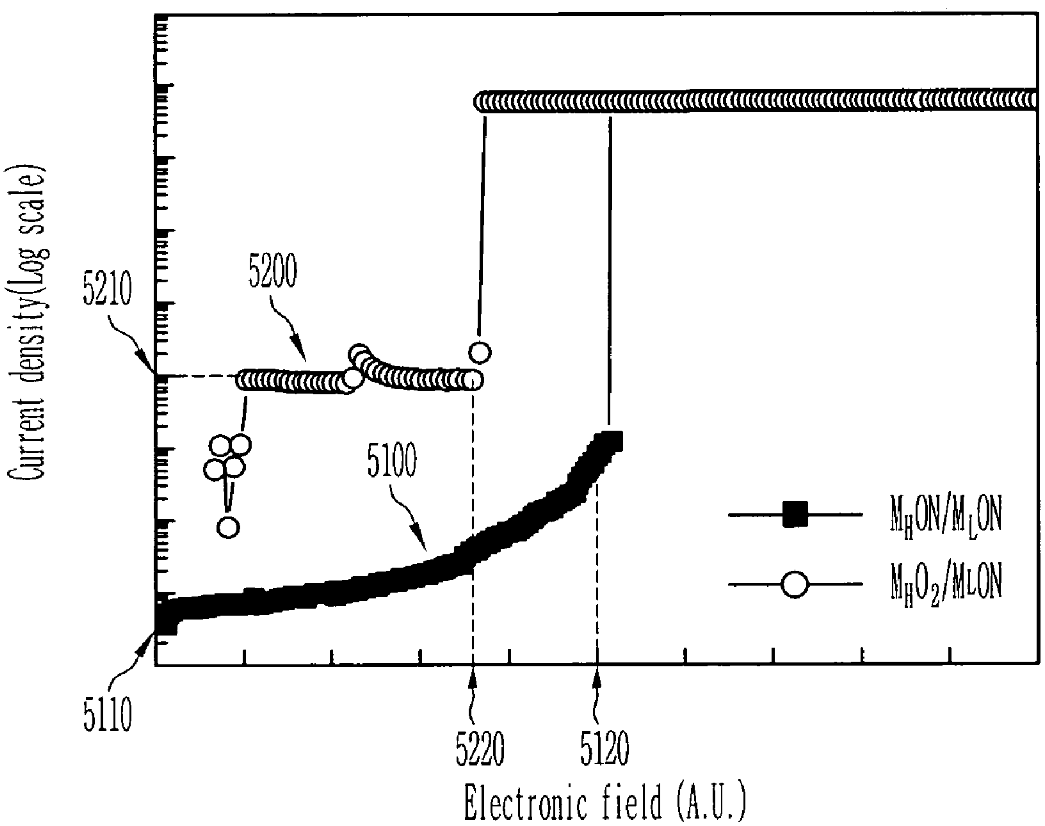

FIG. 4 is a view for comparing the breakdown and leakage current characteristic of the multi-layered insulating layer, in two cases: the high-k film is deposited by PEALD, and it is deposited by ALD.

The leakage current 5110, in case 5100 where $M_HON$ grown by PEALD is used as the high-k film, is lower than the leakage current 5210, in case 5200 where $M_HO_2$ grown by ALD is used as the high-k film. In addition, the breakdown field 5120, in case 5100 where $M_HON$ grown by PEALD is used as the high-k film, is higher than the breakdown field 5220, in case 5200 where $M_HO_2$ grown by ALD is used as the high-k film. Therefore, it can be noted that the case 5100 where $M_HON$ grown by PEALD is used as the high-k film has more improved characteristic than the case 5200 where $M_HO_2$ grown by ALD is used as the high-k film.

Now, variations of characteristics according to the thickness ratio of the high-k film and the low-k film, in the inorganic thin film electroluminescent device according to the present embodiment, will be explained.

Figure 5:
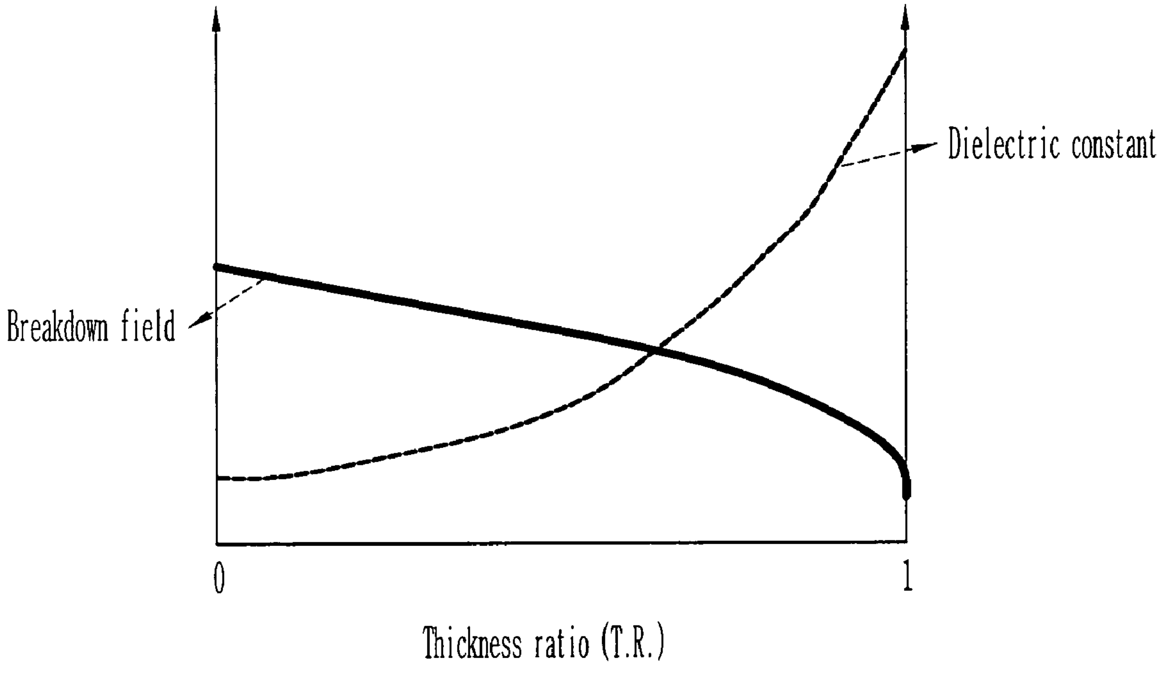
FIG. 5 is a graph for showing variations of breakdown characteristic and dielectric constant, depending on a thickness ratio of a high-k film and a low-k film in an inorganic thin film electroluminescent device, according to a preferred embodiment of the present invention.

FIG. 5 shows variations of the breakdown field and the dielectric constant according to the thickness ratio, in case where the high-k film is disposed at the interface with the phosphor and the low-k film is disposed at the interface with the electrode.

The figure of merit, which determines the performance of the insulator, can be obtained by the aforementioned two factors. Thus, by controlling the thickness ratio, the device having the best performance can be implemented and controlled.

At this time, the dielectric constant in the 2-layered insulating layer can be expressed as follow in equations 1 and 2:

$$\frac{T_{total}}{\varepsilon_{total}} = \frac{T_H}{\varepsilon_H} + \frac{T_L}{\varepsilon_L} \quad \langle\text{Equation 1}\rangle$$

$$\varepsilon_{total} = \frac{\varepsilon_H \varepsilon_L T_{total}}{\varepsilon_L T_H + \varepsilon_H T_L} \quad \langle\text{Equation 2}\rangle$$

Here, T and ∈ refer to the dielectric constants, respectively, sub letters H and L indicate the high-k film and the low-k film, respectively. The above equations can be expressed as the thickness ratio (TR), that is, the thickness of the high-k film to the total thicknesses of the insulating layers, in equation 3 as follow $$\varepsilon_{total} = \frac{\varepsilon_L \varepsilon_H}{\varepsilon_H - (\varepsilon_H - \varepsilon_L)TR} \quad \langle\text{Equation 3}\rangle$$

The breakdown voltage of the 2-layered insulating layer can be obtained by experimentation of measuring the breakdown voltage while varying the thickness ratio.

The 2-layered insulating layer has more improved figure of merit in case that the thickness ratio is in the range of ⅙ to ½, as compared with the maximum value that is the reported value conventionally in insulator for a device.

According to the aforementioned explanation and results, it can be noted that it is required to employ PEALD method and to dispose the high-k film at the interface with the phosphor, at the same time, in order to insure the excellent stability, high brightness, and high efficiency. Further, the present inventors could obtain the figure of merit of approximately 11 $\mu C/cm^2$ in the insulator, by controlling the thickness of TiON/AlON to 1:2. The above value is much higher than 4 to 6 $\mu C/cm^2$, corresponding to the maximum value that is reported generally in the conventional insulator for a device, and 8 to 9 $\mu C/cm^2$ in the case of using $TiO_2/Al_2O_3$ thin film.

Therefore, the present invention has a merit that the high stability and performance of the device can be obtained, by employing PEALD method, in which $N_2$ and $O_2$ are used as the reaction gas, and using the multi-layered insulating layer comprising the low-k film and the high-k film that is contacted with the phosphor.

In addition, according to the present invention, the best condition can be designed by controlling the thickness ratio of the high-k film and the low-k film, and controlling the dielectric constant and the breakdown field.

The various change and modification of the present invention can be made without departing from the technical spirit and the scope of the present invention. Accordingly, it is intended that the aforementioned description for the implementation of the present invention be provided not for restricting the present invention limited by the appended claims and its equivalent but only for explaining the present invention.

The present application contains subject matter related to korean patent application no. 2003-64960, filed in the Korean Patent Office on Sep. 19, 2003, the entire contents of which being incorporated herein by reference.

What is claimed is:

1. A method for manufacturing an inorganic thin film electroluminescent device, comprising the steps of:
forming a lower electrode;
forming a lower insulating layer on the lower electrode;
forming a phosphor on the lower insulating layer;
forming an upper insulating layer on the phosphor; and
forming an upper electrode on the upper insulating layer,
wherein at least one of the steps of forming the lower insulating layer and the upper insulating layer is a step of forming a multi-layered insulating layer having a low-k film and a high-k film, which is contacted with the phosphor; and
wherein the step of forming the insulating layer or the dielectric film (the high-k film or the low-k film) comprises one or more than two PEALD cycles, each PEALD cycle comprising the steps of:
injecting a precursor;
performing a first purge;
applying direct plasma while injecting a reaction gas; and
performing a second purge.

2. The method of claim 1, in case where the dielectric film is the high-k film, the precursor includes Ta, Ti, Y, Zr, Zn, Mg, Ca, Hf, Ba, or lanthanide.

3. The method of claim 1, in case where the dielectric film is the low-k film, the precursor is trimethyl aluminum (TMA).

4. The method of claim 1, wherein the reaction gas is $O_2$+$N_2$ or $O_2$.

5. The method of claim 1, the step of forming the multi-layered insulating layer is performed in-situ.

* * * * *